(12) United States Patent
Critzer

(10) Patent No.: US 6,694,925 B2
(45) Date of Patent: Feb. 24, 2004

(54) THUNDERSTORM FEAR-REDUCING CAPE FOR DOGS

(76) Inventor: Thomas F. Critzer, 4648 Celadon Ave., Fairfield, OH (US) 45014

( * ) Notice: Subject to any disclaimer, the term of this patent is extended or adjusted under 35 U.S.C. 154(b) by 0 days.

(21) Appl. No.: 10/277,318

(22) Filed: Oct. 23, 2002

(65) Prior Publication Data

US 2003/0221636 A1 Dec. 4, 2003

Related U.S. Application Data

(60) Provisional application No. 60/383,569, filed on May 28, 2002.

(51) Int. Cl.[7] .......................... A01K 13/00; B68G 11/00
(52) U.S. Cl. ........................................ 119/850; 54/79.4
(58) Field of Search ............... 119/850; 54/79.1, 54/79.2, 79.4; D30/144, 145

(56) References Cited

U.S. PATENT DOCUMENTS

| | | | | |
|---|---|---|---|---|
| 5,060,458 A | * | 10/1991 | Curtis | 54/79.2 |
| 5,996,537 A | * | 12/1999 | Caditz | 119/850 |
| 6,089,194 A | * | 7/2000 | LaBelle | 119/850 |
| 6,119,635 A | * | 9/2000 | Powell-Lesnick | 119/850 |
| 6,138,611 A | * | 10/2000 | Thielemann | 119/850 |

\* cited by examiner

*Primary Examiner*—Charles T. Jordan
*Assistant Examiner*—Elizabeth Shaw

(57) ABSTRACT

A thunderstorm fear-reducing garment to be worn by dogs. The lining of the garment proximate to the dog made, at least in major part, of an electrically conductive material such as lamé which contains metallic thread. The garment discharges the dog's fur of static electricity and provides a shield prior to and during an electrical thunderstorm.

2 Claims, 1 Drawing Sheet

THUNDERSTORM FEAR-REDUCING CAPE FOR DOGS

CROSS-REFERENCE TO RELATED APPLICATION

This application claims the benefit of provisional Patent Application Ser. No. 60/383,569 filed May 28, 2002.

BACKGROUND OF INVENTION

Dogs often sense an oncoming thunderstorm before humans do. Some dogs show a fear of thunderstorms that borders on terror. These dogs exhibit signs of anxiety upon the approach of a storm, such as pacing, panting, hiding or getting under things. They seek shelter in bathrooms or around pipes. They try to get near their master for comfort. Their behavior resembles that of a phobia. Veterinarians sometime prescribe tranquilizer-type medications for dogs who respond this way to thunderstorms. Behavior modification therapy, counter conditioning or desensitization style treatment has often been recommended, but these treatments are extensive and minimally effective. Accordingly, there is a need to provide a means to reduce the stress and soothe these animals during that period surrounding thunderstorms.

BRIEF SUMMARY OF THE INVENTION

The present invention is based upon the hypothesis that dogs sense and respond to a buildup of static electricity prior to and during a thunderstorm. Accordingly, a cape which contains an electrically conductive lining comprised of material containing metallic threads discharges the dog's fur and provides a shield against static charge, thus reducing their fear.

When placed on the dog prior to and during a thunderstorm, the cape reduces the aberrant behavior of the dog. The inventor believes, from observation of dogs that have worn the present invention, that previously assumed reinforcers such as sound, lightning, rain, temperature change, humidity change, barometric pressure change are secondary to the primary reinforcer, which is the buildup of a static charge.

DETAILED DESCRIPTION OF THE INVENTION

The key to the present invention is not in the size or shape of the cape but in the electrically conductive lining. Nevertheless, the cape should cover the main body of the animal and be comfortable to wear.

Although the outer layer of the cape is preferably made of a simple cotton-polyester, any flexible material could be used. It will be understood that the function of the outer layer is to hold the electrically conductive lining in place.

The lining may preferably be made of Lamé material (which contains more than 50 percent metallic thread). Buttons are used for fasteners because they are non-metallic, simple, and inexpensive. The cape is made by sewing the pattern made of cotton-polyester to the Lame, turning it inside out, and finish sewing with a top stitch.

Figure 1:
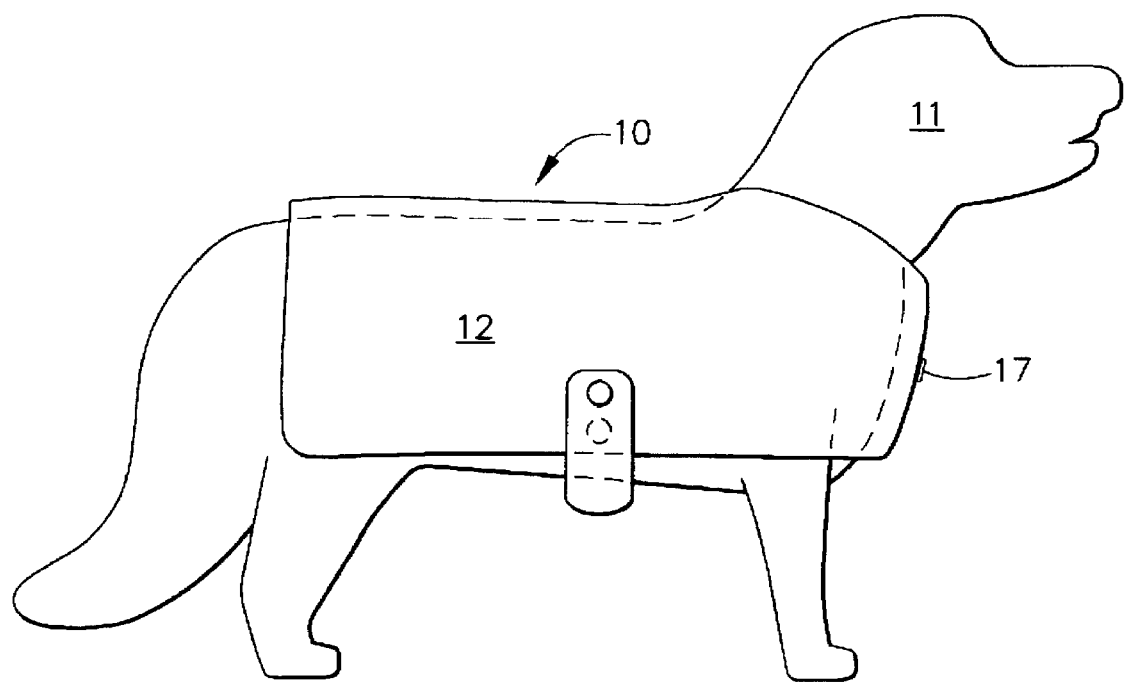
Figure 2:
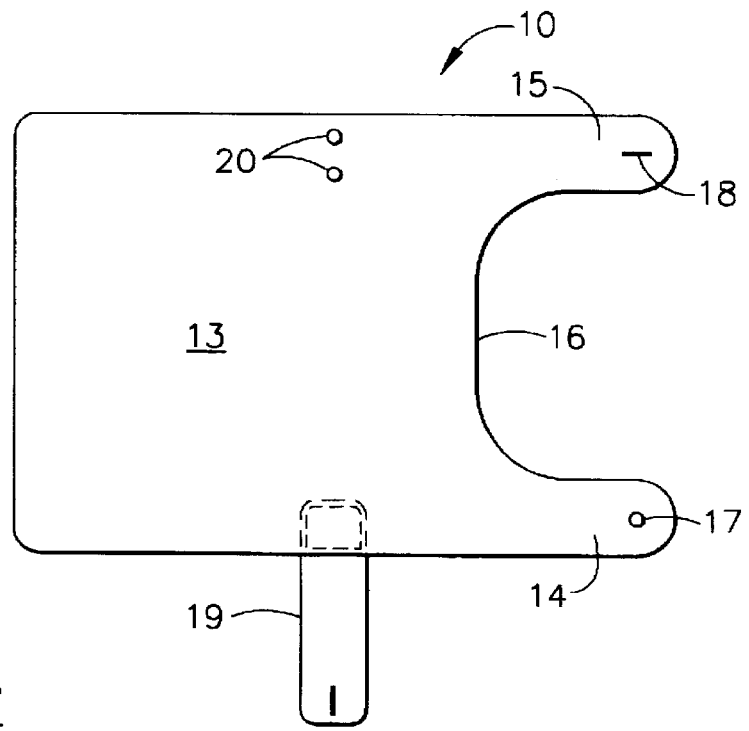

Referring now to FIG. 1, there is shown the present invention dog garment 10 on dog 11. Garment 10 is a flexible cape comprised of two layers: an outer layer 12 and, as seen in FIG. 2, an inner layer 13. Outer layer 12 is formed from a generally soft, non-static-generating material such as cotton-polyester. Those skilled in the art will appreciate that many other materials would suffice.

Referring to FIG. 2, inner layer 13 is a lining preferably made of lamé material containing metallic thread. Aluminum thread is effective for the purposes of the present invention, but other electrically conductive material may be substituted. The outer layer and the inner layer are coincident and connected to each other about their periphery, such as by stitching. They form a cape that fits comfortably on the dog. The cape fits on the dog's back and around the neck and buttons under the chin with button 17 into buttonhole 18. Strap 19 goes under the dog's belly and buttons on the other side. It will be readily appreciated that the specific size of the garment and the location of the fastening means may be varied to fit a particular dog. Specifically, minor adjustments of the placement of said buttons may be make to comfortably fit the dog.

The cape should be put on the dog at the first sign of agitation prior to or during a thunderstorm. Timing is important. A cape placed on the dog after the storm is raging and the dog highly excited, will be minimally effective. The dog should be left alone to learn that the secondary reinforcers (sound, lightning, rain, barometric changes, etc.) are no longer related to the primary reinforcer, the buildup of a static electrical charge. The cape should not be used when there is no threat of storm and should be removed when the storm has passed. It should be understood that the cape is for indoor use only.

Many modifications may come to mind to those that are ordinarily skilled in the art and such can be made without departing from the scope of the invention. Accordingly, the scope is intended to be limited only by the following claims:

What is claimed is:

1. A garment for calming dogs that are afraid of thunderstorms comprising:
   an electrically conductive coat sized to be worn by a dog wherein said electrically conductive coat is composed of an inner liner of electrically conductive, preferably lamé, material of at least 51% metallic thread;
   an outer non-statically conductive layer; and
   a means for fastening said electrically conductive coat such that it covers the torso of said dog, allowing said dog to continue to perform basic functions;
   whereby said inner liner of electrically conductive material is against the body of said dog so as to discharge any build up of static electricity in said dog's fur and to shield from static charge build up during the duration of the thunderstorm, thus keeping the dog calm.

2. A method of calming dogs that are afraid of thunderstorms comprising:
   providing an electrically conductive garment to be worn by a dog wherein said electrically conductive garment is composed of an inner liner of electrically conductive, preferably lamé, material of at least 51% metallic thread, an outer non-statically conductive layer, and a means for fastening the garment around the torso of said dog; and wherein the electrically conductive garment covers the torso of said dog, allowing said dog to continue to perform basic functions;
   noticing the increased agitation of said dog due to an approaching thunderstorm and rising static electricity in the air; and
   placing said electrically conductive garment on and around the torso of said dog such that said inner liner of electrically conductive material is against the body of said dog so as to discharge any build up of static electricity in said dog's fur and to shield from static charge during the duration of the thunderstorm, thus keeping the dog calm.

* * * * *